US009491311B1

(12) United States Patent
Sharma

(10) Patent No.: US 9,491,311 B1
(45) Date of Patent: Nov. 8, 2016

(54) MODULAR OFFLINE CHARGING SYSTEM THAT STORES ACCOUNTING DATA IN DATA SEGMENTS OF A STORAGE SYSTEM

(71) Applicant: Alcatel-Lucent USA Inc., Murray Hill, NJ (US)

(72) Inventor: Ranjan Sharma, New Albany, OH (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 14/748,085

(22) Filed: Jun. 23, 2015

(51) Int. Cl.
*H04M 11/00* (2006.01)
*H04M 15/00* (2006.01)
*H04W 4/24* (2009.01)

(52) U.S. Cl.
CPC .............. *H04M 15/65* (2013.01); *H04W 4/24* (2013.01)

(58) Field of Classification Search
CPC .............. H04L 12/14; H04L 65/1016; H04L 12/1403; H04L 65/1006; H04L 65/1083; H04L 12/1471; H04L 12/1425; H04L 12/1435; H04L 12/1439; H04L 12/1457; H04L 12/1482; H04L 12/1407; H04L 12/189
USPC ........................................................ 455/406
See application file for complete search history.

(56) References Cited

U.S. PATENT DOCUMENTS

| 2009/0063315 | A1* | 3/2009 | Cai ..................... G06Q 30/0284 705/32 |
| 2010/0005012 | A1* | 1/2010 | Wahlberg ............... G06Q 30/04 705/30 |
| 2012/0009895 | A1* | 1/2012 | Kotalwar ................ H04L 12/14 455/406 |
| 2012/0030077 | A1  | 2/2012 | Pei et al. |

OTHER PUBLICATIONS

P. Calhoun et al., Diameter Base Protocol, Network Working Group, Request for Comments: 3588, The Internet Society, Sep. 2003.
V Fajardo et al., Diameter Base Protocol, Internet Engineering Task Force (IETF), Request for Comments: 6733, Oct. 2012.

* cited by examiner

*Primary Examiner* — Kwasi Karikari
(74) *Attorney, Agent, or Firm* — Duft Bornsen & Fettig, LLP

(57) ABSTRACT

Systems and methods for offline charging. An Offline Charging System (OFCS) includes a data storage system partitioned into a plurality of data segments, a plurality of Input/Output (I/O) devices configured to communicate with the data storage system, and a plurality of charging function devices configured to communicate with the data storage system. An I/O device receives an accounting record for an accounting session, selects a data segment of the data storage system for the accounting session, and stores the accounting record for the accounting session in the data segment. A charging function device retrieves a copy of the accounting record for the accounting session from the data segment, and processes the copy of the accounting record to generate a CDR for the accounting session.

20 Claims, 10 Drawing Sheets

MODULAR OFFLINE CHARGING SYSTEM THAT STORES ACCOUNTING DATA IN DATA SEGMENTS OF A STORAGE SYSTEM

FIELD OF THE INVENTION

The invention is related to the field of communication systems and, in particular, to offline charging.

BACKGROUND

Service providers typically provide numerous voice and data services to end users (also referred to as subscribers). Examples of voice services are voice calls, call forwarding, call waiting, etc. Examples of data services are streaming audio, streaming video, Voice over Internet Protocol (VoIP), online gaming, and IP-TV. The data services are managed by a packet core network, which interfaces the end user with external Packet Data Networks (PDN), such as the Internet. Some examples of packet core networks are a General Packet Radio Service (GPRS) core network, an Evolved Packet Core (EPC) of a Long Term Evolution (LTE) network, etc. Mobile devices, such as cell phones, personal data assistants, smart phones, notebook computers, etc., may access the data services provided by the networks over an air interface with one or more base stations.

The service providers use offline and online charging functions to keep track of the resource usage incurred by each device accessing the various services. The 3GPP/3GPP2 standards groups have defined a set of specifications that may be used to implement online charging systems and offline charging systems in the various network domains (e.g., a circuit-switched domain, a packet-switched domain, and/or a wireless domain), IP multimedia subsystems (IMS), and emerging 3G/OMA application services.

According to 3GPP TS 32.240, offline charging is a process where charging information for network resource usage is collected concurrently with the resource usage. The charging information is passed through a chain of charging functions, which results in the generation of Charging Data Record (CDR) files that are transferred to the network operator's Billing Domain for subscriber billing and/or inter-operator accounting. To implement offline charging, a Charging Trigger Function (CTF) is implemented in a network element that provides a service. The CTF collects information pertaining to chargeable events, assembles this information into matching charging events, and sends the charging events to a Charging Data Function (CDF), which may be implemented in the network element or in the Offline Charging System (OFCS). The charging events may be provided by the CTF in an accounting request, such as a Diameter Accounting Request (ACR).

The CDF receives the charging events from one or more CTFs, and uses the information included in the charging events to construct CDRs. A CDR is a formatted collection of information about a chargeable event (e.g., time of call or session set-up, time of call or session tear-down, amount of data transferred, etc.) for use in billing and accounting. The CDF then sends the CDRs to a Charging Gateway Function (CGF) of the OFCS. The CGF acts as a gateway between the network and the billing domain. Therefore, the CGF collects CDRs from the CDF (and other CDFs), optionally correlates the CDRs and writes the CDRs into a CDR file, and makes the CDR file available to the billing domain.

A typical operator network will utilize multiple CDFs and CGFs to implement offline charging. Thus, a front-end device, such as a Diameter Routing Agent (DRA), is used in conjunction with the OFCS to distribute charging events from the CTFs to the CDFs. The front-end device typically uses a distribution algorithm to select a CDF for a particular session. For example, a distribution algorithm may process a session identifier from a Diameter ACR with a hashing function or another function to select a CDF. The front-end device then routes the Diameter ACR to the selected CDF. The CDF for a particular accounting session will store data for the ACR locally until the accounting session ends and one or more CDRs are generated. If the CDF happens to fail during the accounting session, the data for ACRs may be lost. Therefore, a network operator will not be able to charge for a complete service or session over the network.

SUMMARY

Embodiments described herein provide for improved offline charging that is less prone to lost revenue. An offline charging system (OFCS) as discussed herein uses a data storage system to store data for accounting sessions. Accounting data for individual accounting sessions is stored in data segments of the data storage system. A charging function device (e.g., CDF) accesses a data segment for an accounting session to obtain and process a copy of the accounting data. The accounting data is therefore kept in the data storage system, and may be processed by different charging function devices. In prior offline charging systems, a CDF received accounting data directly from a distributor, and stored the accounting data in local memory for the duration of the accounting session. If this CDF failed during the accounting session, then the accounting data would be lost and the network operator would lose revenue. In an OFCS as discussed herein, input devices store accounting data in the storage system, and charging function devices may access copies of the accounting data to generate CDRs. If a charging function device would happen to fail during an accounting session, another charging function device can access the accounting data for that accounting session in the storage system and generate the CDR(s) for the accounting session. Therefore, the OFCS provided herein is more robust, and less prone to failures that result in lost revenue for a network operator.

One embodiment is an OFCS that includes a data storage system partitioned into a plurality of data segments, a plurality of Input/Output (I/O) devices configured to communicate with the data storage system, and a plurality of charging function devices configured to communicate with the data storage system. An I/O device is configured to receive an accounting record for an accounting session, to select a data segment of the data storage system for the accounting session, and to store the accounting record for the accounting session in the data segment. A charging function device is configured to retrieve a copy of the accounting record for the accounting session from the data segment, and to process the copy of the accounting record to generate a CDR for the accounting session.

In another embodiment, the charging function device is configured to store state information for the accounting session in the data segment.

In another embodiment, the state information includes a sequence number for the partial CDR, and time stamps indicating a start time of the accounting session, and indicating a receipt time of the latest accounting record.

In another embodiment, the charging function device is configured to store a copy of the partial CDR in the data segment.

In another embodiment, the charging function device is configured to forward the CDR to a CDR file system when the CDR comprises a complete CDR.

In another embodiment, the charging function device is configured to transmit an instruction to the data storage system to delete data for the accounting session from the data segment.

In another embodiment, the charging function devices each implement a Charging Data Function (CDF) and a Charging Gateway Function (CGF).

In another embodiment, the data storage system comprises cloud storage.

In another embodiment, the I/O device is configured to select the data segment based on an IMS Charging Identifier (ICID) assigned to the accounting session.

In another embodiment, the I/O device is configured to select the data segment based on a session identifier assigned to the accounting session.

Another embodiment comprises a method for implementing an OFCS. The method includes receiving (by an I/O device) an accounting record for an accounting session, selecting a data segment of the data storage system for the accounting session, and storing the accounting record for the accounting session in the data segment. The method further includes retrieving (by a charging function device) a copy of the accounting record for the accounting session from the data segment, and processing the copy of the accounting record at the charging function device to generate a CDR for the accounting session.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
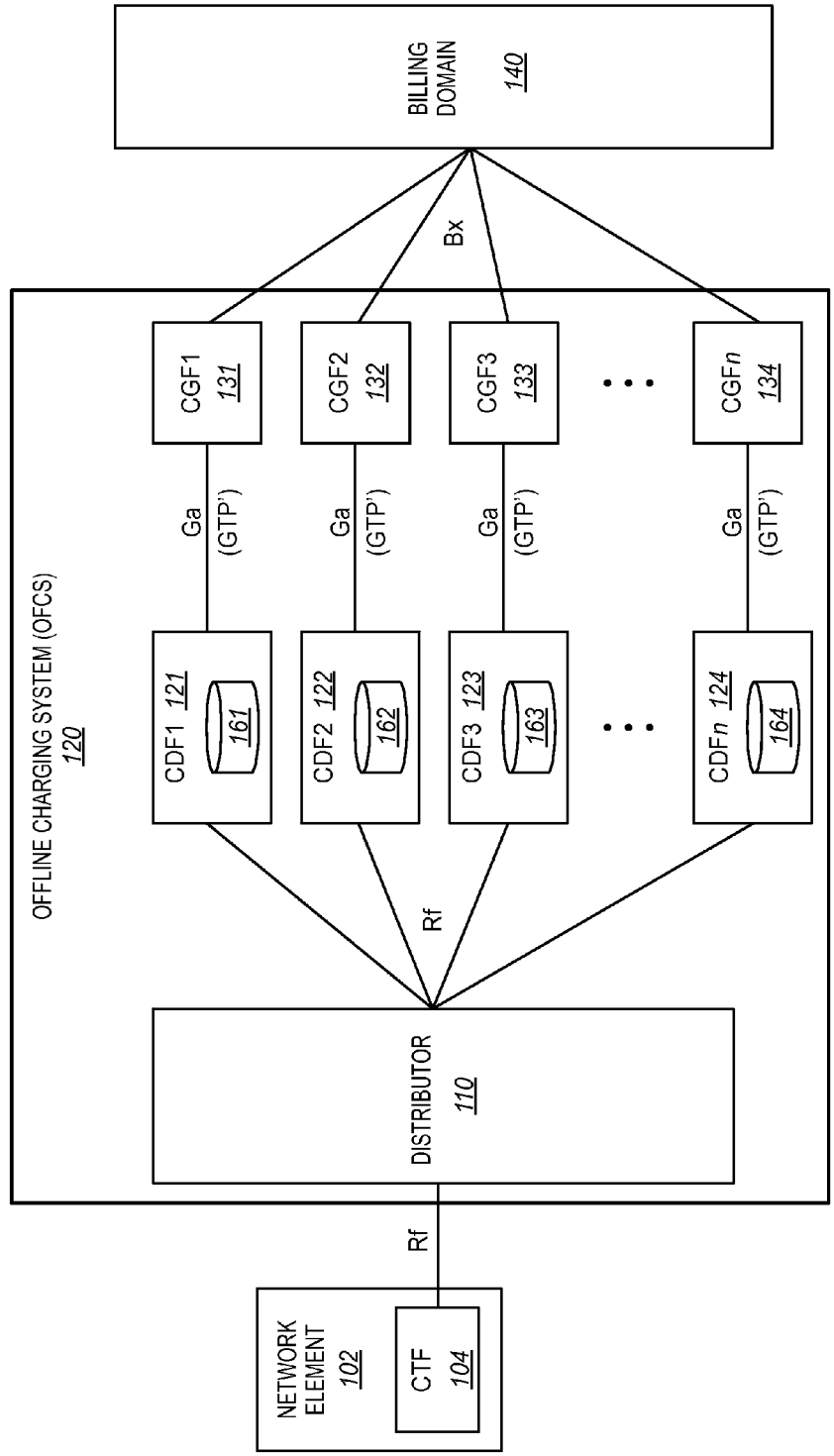
FIG. 1 illustrates an offline charging architecture in the prior art.

FIG. 1 illustrates an offline charging architecture 100 in the prior art. Architecture 100 includes a network element 102 that connects to an offline charging system (OFCS) 120 through a distributor 110. Network element 102 includes a Charging Trigger Function (CTF) 104 that detects chargeable events for services provided by network element 102, assembles information for the chargeable events into matching charging events, and sends the charging events to a Charging Data Function (CDF). In the case of network element 102, CTF 104 may use a Diameter Rf interface. Therefore, CTF 104 assembles the charging information into accounting requests, such as a Diameter Rf Accounting Request (ACR). Although one CTF 104 is illustrated in FIG. 1, there may be CTFs of many network elements in contact with distributor 110.

OFCS 120 is an apparatus, a server, a device, or equipment configured to implement offline charging for sessions or services provided by a network. Offline charging can be of two types: session-based or event-based. In event-based charging, the CTF reports the usage or the service rendered where the service offering is rendered in a single operation, such as subscriber registration, re-registration, de-registration, etc. The CTF reports the usage in an ACR EVENT. Session-based charging is the process of reporting usage reports for a session, and uses the Start, Interim, and Stop accounting data. During a session, CTF 104 may transmit 0, 1, or multiple interim accounting requests depending on the proceeding of the session.

OFCS 120 includes multiple instances of a CDF (CDF1-CDFn) 121-124 and a CGF (CGF1-CGFn) 131-134. A CDF comprises an element or module within OFCS 120 that receives charging events from CTFs within network elements, formats the charging events into CDRs, and sends the CDRs to a CGF. A CGF comprises an element or module within OFCS 120 that correlates CDRs for a session, and forwards a CDR file with the correlated CDRs to a billing domain 140. Billing domain 140 is the part of the operator network that receives and processes CDR files for billing mediation and other billing applications (e.g., statistical applications). The CDFs in OFCS 120 may communicate with the CGFs over a Diameter Ga interface. In the case shown in FIG. 1, GTP' may be used on the Ga interface to transport CDRs from the CDFs to the CGFs. While a 1:1 relationship is shown between the CDFs and CGFs in FIG. 1, an N:1 relationship is also possible.

Distributor 110 is implemented between CTFs (e.g., CTF 104) and the CDFs 121-124 in OFCS 120. The purpose of distributor 110 is to distribute accounting requests (e.g., Diameter ACRs) from CTFs among the multiple CDFs 121-124 within OFCS 120. Distributor 110 may select CDFs for handling accounting requests based on a distribution algorithm, such as a "consistent hashing" algorithm.

Each CDF 121-124 includes a local memory 161-164, respectively, which is used to store accounting data when a CDF is handling an accounting session (which may also be referred to as a Diameter session). For example, when CDF 121 receives an accounting request, CDF 121 will process the data in the accounting request to format a CDR for the accounting session. CDF 121 stores data such as this for the accounting session in local memory 161.

One problem with the architecture of OFCS 120 is that data for an accounting session may be lost if CDF 121 fails during the accounting session. Because accounting data is stored locally in CDF 121, this data can be lost if CDF 121 fails. The network operator would therefore lose revenue. The following embodiments describe an enhanced offline charging architecture that is less prone to revenue loss.

Figure 2:
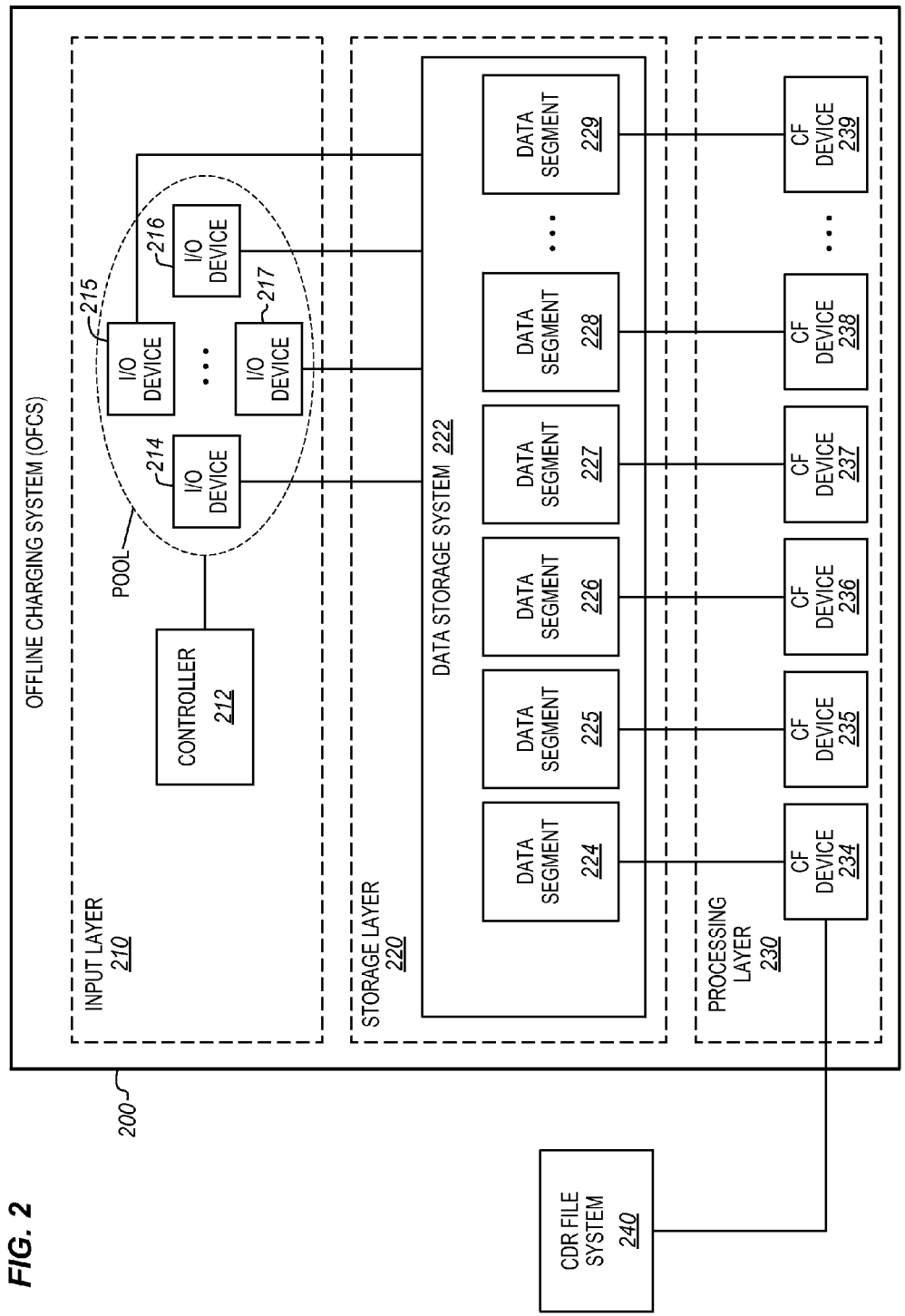
FIG. 2 illustrates an offline charging system in an exemplary embodiment.

FIG. 2 illustrates an offline charging system 200 in an exemplary embodiment. Offline charging system (OFCS) 200 is an apparatus, a server, a device, or equipment configured to implement offline charging for sessions or services provided by a network. In this embodiment, OFCS 200 includes an input layer 210, a storage layer 220, and a processing layer 230. The architecture of OFCS 200 is modularized so that input layer 210 is segregated from processing layer 230 by storage layer 220.

Input layer 210 represents the equipment, devices, functions, etc., that receive accounting records for accounting sessions. An accounting record is a collection of charging data for an accounting session, such as a Diameter Accounting Request (ACR) or a Charging Data Record (CDR). Input layer 210 may receive the accounting records from Charging Trigger Functions (CTFs) of network elements, or from an intervening distributor. In this embodiment, input layer 210 includes a controller 212 and a pool of input/output (I/O) devices 214-217. Controller 212 is configured to select an I/O device 214-217 from the available pool. An I/O device is configured to receive accounting records, and to store the accounting records in a particular location within storage layer 220. An instance of an I/O device 214-217 may comprise an Rf handler or a Ga handler. Depending on the type of accounting record that is received (e.g., ACR or CDR), controller 212 selects an I/O device 214-217 for Rf handling or an I/O device 214-217 for Ga handling from the available pool. Input layer 210 may be scalable, where additional I/O devices may be added if the demands exceed the load handling capacity.

Storage layer 220 represents the equipment, devices, functions, etc., that store data for accounting sessions. The data for an accounting session may be any data used to perform accounting functions within an offline charging system. For example, storage layer 220 may be used to store ACRs, CDRs, or state information for active accounting sessions. Storage layer 220 includes a data storage system 222, which comprises some type of shared memory or shared database that is accessible by input layer 210 and processing layer 230. For example, storage layer 220 may comprise cloud storage that is hosted on a remote platform that is accessible to elements of input layer 210 and processing layer 230 over a network, such as the internet.

Data storage system 222 is partitioned into a plurality of data segments 224-229. A data segment 224-229 may also be referred to herein as a shard, partition, bucket, etc. Each data segment 224-229 of data storage system 222 is used to store data for one or more accounting sessions. The configuration of data storage system 222 may vary as desired. In one embodiment, each data segment 224-229 may be set up in a master-slave replication mode (e.g., a 1+1 replication method, a 1+2 replica mode, etc.).

Processing layer 230 represents the equipment, devices, functions, etc., that process data for accounting sessions to generate CDRs that are passed to a billing domain. Processing layer 230 includes one or more charging function (CF) devices 234-239. A CF device implements charging functions for offline charging, which includes processing accounting requests (e.g., Diameter ACR) to generate a CDR for an accounting session. For example, each CF device 234-239 may provide an instance of a CDF and CGF, or an instance of a Charging Collector Function (CCF), that process accounting requests and generate CDRs. In this embodiment, each CF device 234-239 is assigned to a data segment 224-229 of data storage system 222. When a CF device 234-239 is assigned to a data segment 224-229, it means that the CF device 234-239 pulls data from that data segment for processing. A CF device 234-239 may be assigned to one data segment 224-229 as shown in FIG. 2, or multiple CF devices 234-239 may be assigned to one data segment. For example, N CF devices (e.g., one, two, four, eight, or some multiple of two) may be assigned to a single data segment. The number of CF devices assigned to a data segment may be uniform within processing layer 230.

Figure 3:
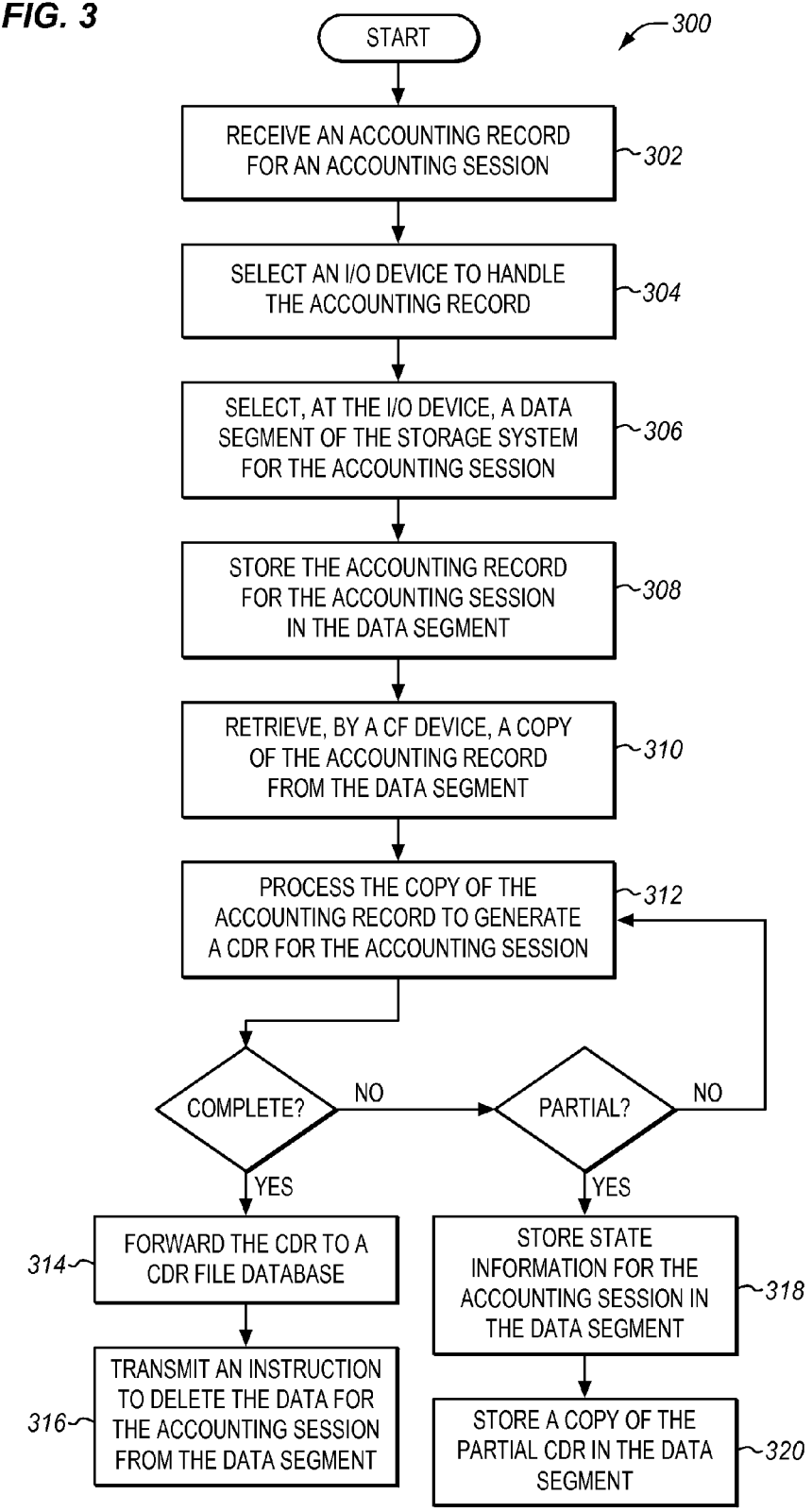
FIG. 3 is a flow chart illustrating a method for offline charging in an exemplary embodiment.

FIG. 3 is a flow chart illustrating a method 300 for offline charging in an exemplary embodiment. The steps of method 300 will be described with reference to OFCS 200 in FIG. 2, but those skilled in the art will appreciate that method 300 may be performed in other systems. Also, the steps of the flow charts described herein are not all inclusive and may include other steps not shown, and the steps may be performed in an alternative order.

To begin, controller 212 in input layer 210 receives an accounting record for an accounting session, such as a Diameter ACR or a CDR (step 302). Controller 212 then selects an I/O device 214-217 to handle the accounting record (step 304) from the pool of available I/O devices. The selection of the I/O device 214-217 for an accounting record may be non-contextual, where consecutive accounting records from the same accounting session may be handled by different I/O devices 214-217. Controller 212 may use a round-robin algorithm to select an I/O device 214-217 from the available pool, or any other desired algorithm.

Assume for this embodiment that I/O device 214 is selected for the accounting record. When I/O device 214 receives the accounting record, it may parse the accounting record to ensure that it is syntactically and semantically correct. I/O device 214 selects a data segment 224-229 of data storage system 222 for the accounting session (step 306). In one embodiment, I/O device 214 may select the data segment 224-229 based on an IMS Charging Identifier (ICID) inserted in the accounting record. In another embodiment, I/O device 214 may select the data segment 224-229 based on a session identifier (e.g., Diameter Session Identifier (DSID)) inserted in the accounting record. The ICID and DSID are both generated in the network, and I/O device 214 may process a placement algorithm that hashes the ICID or DSID to select a specific data segment 224-229. The distribution of accounting sessions among the data segments 224-229 may be a fair distribution process.

After selecting a data segment (assume data segment 224), I/O device 214 stores the accounting record for the accounting session in the data segment 224 (step 308). Data segment 224 represents the storage location where all data for the accounting session is stored. Each I/O device or CF device will use the same distribution algorithm to find the location for the accounting session. Therefore, data segment 224 will store all the accounting records for the accounting session along with other data for the accounting session, such as partial CDRs, state information, etc.

CF device 234 is assigned to data segment 224 in this embodiment, and is tasked with handling accounting records that are stored in data segment 224. When a new accounting record is stored in data segment 224, CF device 234 retrieves a copy of the accounting record from the data segment 224 (step 310). CF device 234 may periodically poll data segment 224 to determine when a new accounting record is saved. CF device 234 may also receive a message from I/O device 214 or controller 212 when a new accounting record is saved in data segment 224. CF device 234 then processes the copy of the accounting record to generate a CDR for the accounting session (step 312). CDF device 232 may retrieve and process other data from data segment 224 regarding the accounting session. The CDR generated by CF device 234 may comprise a complete CDR or partial CDR. For example, when CF device 234 processes an initial accounting record for an accounting session, it may open a CDR for the accounting session. There may be a trigger to close the CDR before the accounting session has ended, such as a CODEC being added or removed for a service, QoS being changed for a service, etc. A CDR that is closed before the accounting session has ended is referred to as a partial CDR, which provides information on part of an accounting session.

If CF device 234 generates a complete CDR for the accounting session, then it forwards the CDR to CDR file system 440 (step 314). Generation of a complete CDR indicates that the accounting session has ended. Therefore, the data for the accounting session need not be stored in data segment 224 any longer. CF device 234 may also transmit an instruction to data storage system 222 to delete the data for the accounting session from data segment 224 (step 316). This step is optional, as data storage system 222 may have its own algorithms or policies for deleting data from its data segments 224-229.

CF device 234 also stores state information for the accounting session in data segment 224 (step 318). The state information indicates what accounting has been performed for the accounting session up to this point in time. For example, the state information may include a sequence number for a partial CDR generated for the accounting session. If this partial CDR is the first partial CDR generated for the accounting session, then the state information may indicate that one partial CDR has been generated for the accounting session. If this partial CDR is the tenth partial CDR generated for the accounting session, then the state information may indicate that ten partial CDRs have been generated for the accounting session. The state information may also indicate time stamps for the accounting session. One time stamp may indicate the start time of the accounting session, and another time stamp may indicate the receipt time of the latest (or most recent) accounting record. CF device 234 may also store a copy of the partial CDR in data segment 224 (step 320).

As is evident in the above embodiment, storage layer 220 acts as an intermediary between input layer 210 and processing layer 230. I/O device 214 stores data for the accounting session in data segment 224, and CF device 234 retrieves a copy of the data for the accounting session from data segment 224. I/O device 214 does not need to send data for the accounting session directly to CF device 234, and CF device 234 does not store the only copy of the data in a local memory. For instance, CF device 234 may take a snapshot of the accounting data in a data segment 224, and work with this image in local memory. When processing of the records is finished, CF device 234 may transfer the processed snapshot back to data segment 224. If CF device 234 happens to fail, another CF device may be assigned to data segment 224 to handle the accounting session. This CF device may retrieve a copy of accounting record(s), a partial CDR(s), and/or state information from data segment 224, and process this data to provide the accounting functions for the accounting session going forward. Therefore, if there is an issue with the original CF device 234 during the processing of the data, no changes are effected in the data segment. Also, state information is processed and written back into data segment 224. This state information includes the record sequence number for an accounting session, which identifies the sequence number of a partial CDR for the accounting session, and the timestamp(s) associated with the accounting record. Therefore, the next partial CDR may capture the start and end of the accounting session correctly.

Because the state information is maintained in the data segments 224-229, it makes CF devices decoupled from the data that they process. This means that a substitution of one CF device with another CF device is a simple assignment task, such as by a scheduler. For example, another CF device (not shown in FIG. 2) may be assigned to data segment 224 upon failure of CF device 234. In this situation, the CF device is able to retrieve a copy of one or more accounting records for the accounting session from data segment 224, and generate a CDR for the accounting session. Because the data for the accounting session is stored in a shared space, any CF device can be assigned to that data segment 224 and take over duties for the accounting session.

There may be situations where more than one CF device 234-239 is assigned to a data segment 224-229. In these situations, a CF device 234-239 may work on sub-segments of a data segment. To ensure that CF devices do not process the same data within a data segment, an algorithm may be used to assign sub-segments to the CF devices. For example, the most significant hex digit of the ICID or session ID may be used to divide the data segment among multiple CF devices. The following illustrates an exemplary distribution of sub-segments among multiple CF devices:

CF Device Count MS Hex Digit
1 All
2 CF device 1 owns 00h-7fh
   CF device 2 owns 80h-ffh
4 CF device 1 owns 00h-3fh
   CF device 2 owns 40h-7fh
   CF device 3 owns 80h-bfh
   CF device 4 owns c0h-ffh

EXAMPLE

Figure 4:
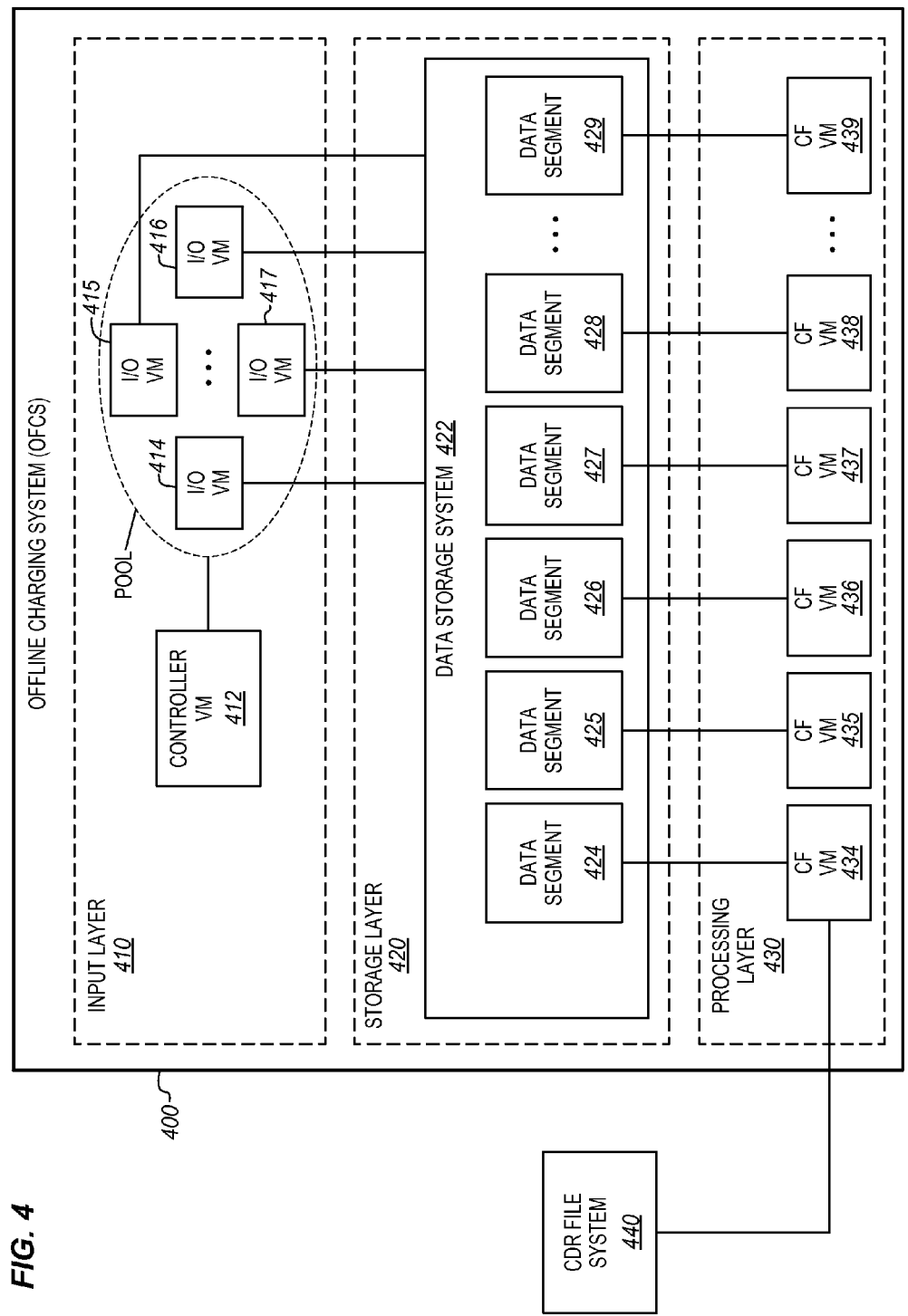
FIG. 4 illustrates a virtualized OFCS in an exemplary embodiment.

An OFCS as described herein may be implemented as a physical network function (e.g., blade server) or as a virtual network function. FIG. 4 illustrates a virtualized OFCS 400 in an exemplary embodiment. OFCS 400 has a similar architecture as OFCS 200 with an input layer 410, a storage layer 420, and a processing layer 430. The elements of input layer 410 comprise virtual machines (VM). A virtual machine is a software computer that runs an operating system and one or more applications, which imitates hardware. Specialized software called a "hypervisor" emulates a Central Processing Unit (CPU), memory, hard disk, network, and other hardware resources. Many virtual machines are able to share the physical resources of a host, and a pool of distributed hardware resources from different hardware platforms may be used to implement multiple virtual machines. In this embodiment, input layer 410 includes a controller VM 412 and a pool of I/O VMs 414-417. Controller VM 412 is configured to select an I/O VM 414-417 from the available pool. An I/O VM is configured to receive accounting records, and to store the accounting records in a particular location within storage layer 420.

Storage layer 420 includes a data storage system 422, which comprises some type of shared memory or shared database that is accessible by input layer 410 and processing layer 430. Data storage system 422 is partitioned into a plurality of data segments 424-429.

The elements of processing layer 430 also comprise virtual machines (VM). Processing layer 430 includes one or more charging function (CF) VMs 434-439. The CF VMs 434-439 implement charging functions for offline charging, which include handling accounting records. For example, each CF VM 434-439 may provide an instance of a CDF and CGF, or an instance of a CCF. In this embodiment, each CF VM 434-439 is assigned to one data segment 424-429 of data storage system 422.

Although not shown in FIG. 4, OFCS 400 may include an active pilot (or administrator) (VM) and a standby pilot VM.

Figure 5:
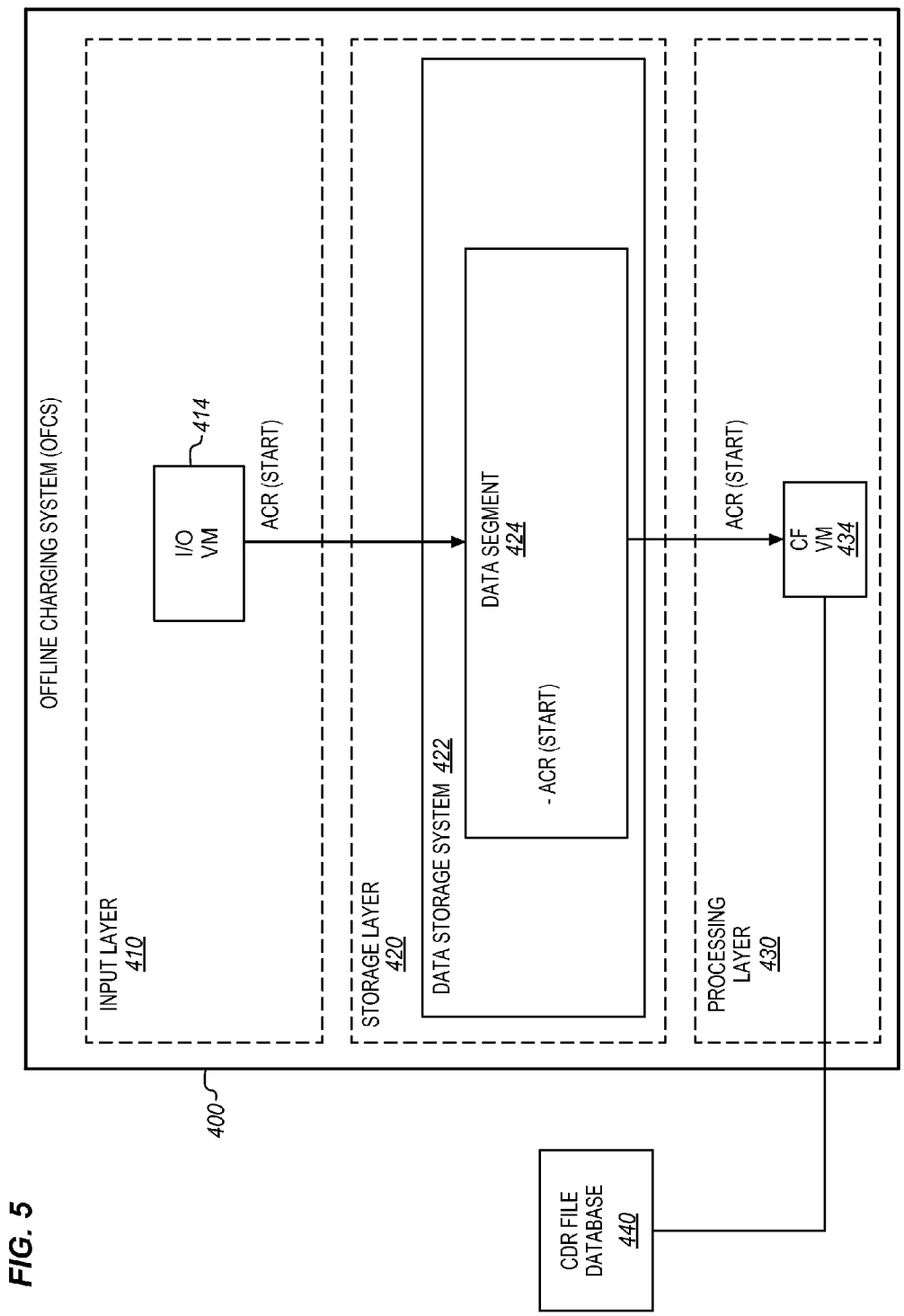
FIG. 5 illustrates an I/O virtual machine (VM) storing an ACR(Start) in a data segment in an exemplary embodiment.

Assume for this example that controller VM 412 receives a Diameter ACR(Start) for an accounting session (for session-based charging). Controller VM 412 selects an I/O VM 414-417 to handle the ACR(Start) from the pool of available I/O VMs. For example, controller VM 412 may use a round-robin algorithm to select an I/O VM 414-417 from the available pool. Assume for this example that I/O VM 414 is selected for the ACR(Start). When I/O VM 414 receives the ACR(Start), it selects a data segment 424-429 of data storage system 422 for the accounting session. For example, I/O VM 414 may select the data segment 424-429 by applying a hash function on the ICID or session ID associated with the accounting session. After selecting a data segment (assume data segment 424), I/O VM 414 stores the ACR(Start) for the accounting session in the data segment 424. FIG. 5 illustrates I/O VM 414 storing the ACR(Start) in data segment 424 in an exemplary embodiment. Data segment 424 represents the storage or memory location where all data for the accounting session is stored. Each I/O VM will use the same distribution algorithm to find this location for the accounting session.

CF VM 434 is assigned to data segment 424 in this example, and is tasked with handling ACRs and other accounting records that are stored in data segment 424. When the ACR(Start) is stored in data segment 424, CF VM 434 retrieves a copy of the ACR(Start) from the data segment 424 (see FIG. 5), and processes the copy of the ACR(Start) for accounting purposes. CF VM 434 processes the ACR(Start) to open a CDR for the accounting session. CF VM 434 will continue to monitor data segment 424 for additional ACRs (Interim or Stop) for the accounting session.

Figure 6:
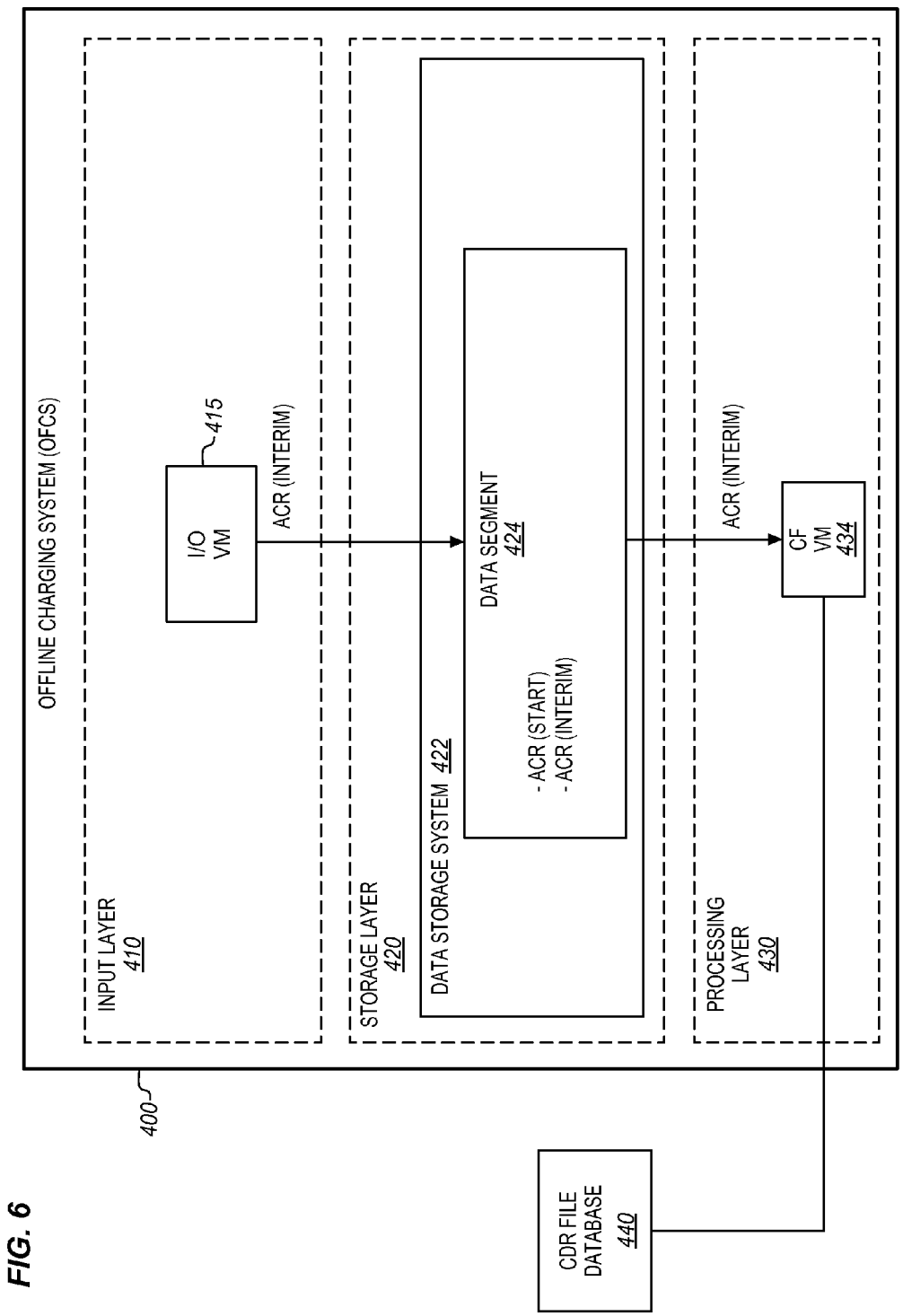
FIG. 6 illustrates an I/O VM storing an ACR(Interim) in a data segment in an exemplary embodiment.

Assume next that controller VM 412 receives a Diameter ACR(Interim) for the accounting session (see FIG. 4). Controller VM 412 selects an I/O VM 414-417 to handle the ACR(Interim) from the pool of available I/O VMs. Assume for this example that I/O VM 415 is selected for the ACR(Interim). When I/O VM 415 receives the ACR(Interim), it selects the same data segment 424 of data storage system 422 for the accounting session (e.g., by hashing the ICID or session ID associated with the accounting session). I/O VM 415 then stores the ACR(Interim) for the accounting session in the data segment 424. FIG. 6 illustrates I/O VM 415 storing the ACR(Interim) in data segment 424 in an exemplary embodiment.

When the ACR(Interim) is stored in data segment 424, CF VM 434 retrieves a copy of the ACR(Interim) from the data segment 424 (see FIG. 6). CF VM 434 then processes the copy of the ACR(Interim) to update the CDR for the accounting session.

Figure 7:
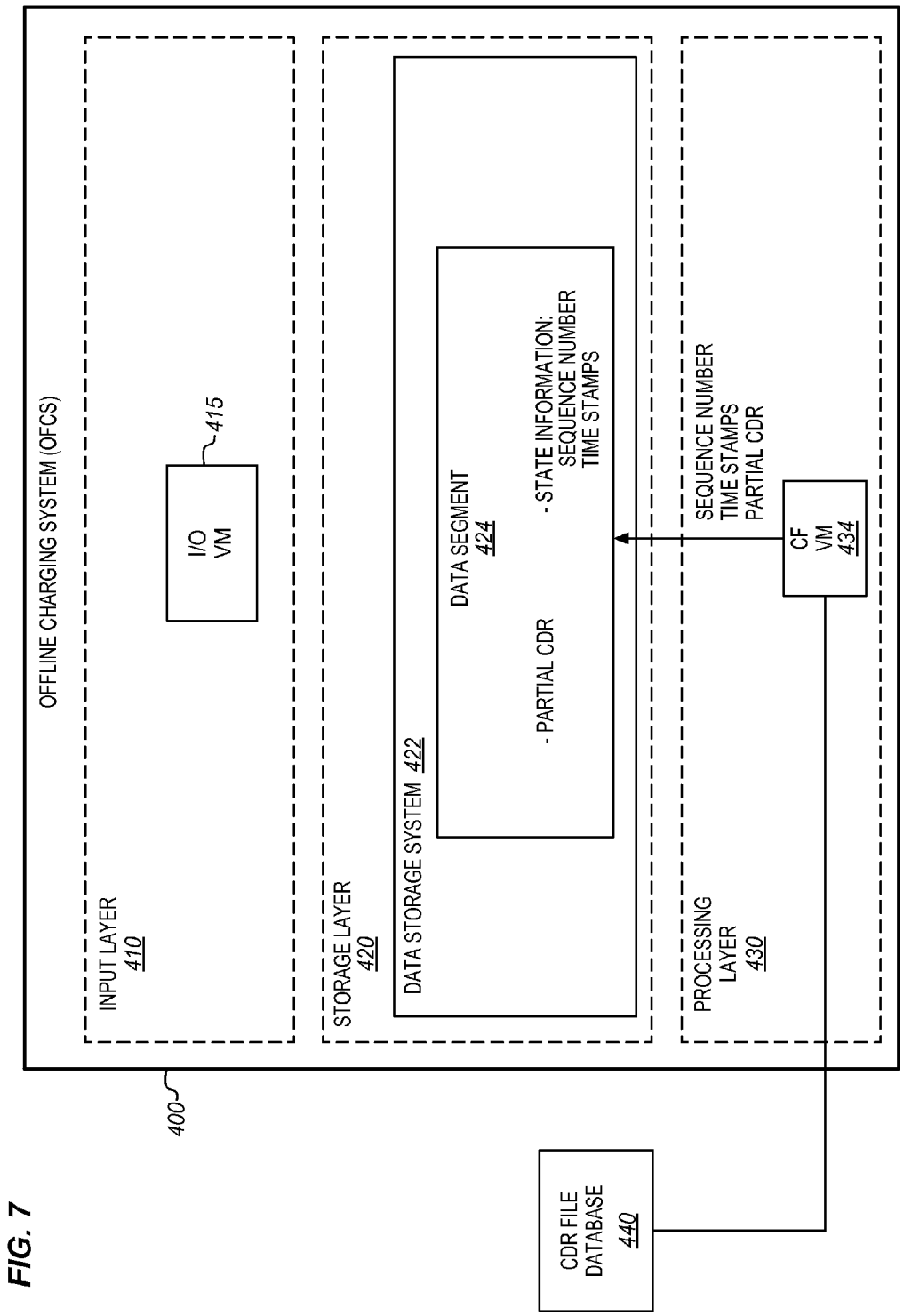
FIG. 7 illustrates charging function VM storing the state information and partial CDR in a data segment in an exemplary embodiment.

Assume in this example that CF VM 434 closes the CDR to generate a partial CDR for the accounting session in response to the ACR(Interim). When CF VM 434 generates a partial CDR for the accounting session, it stores state information for the accounting session in data segment 424. For example, CF VM 434 may store a sequence number for the partial CDR in data segment 424 and time stamps for the accounting session. One time stamp may indicate the start time of the accounting session, and the other time stamp may indicate the receipt time of the latest ACR. CF VM 434 may also store a copy of the partial CDR in data segment 424. FIG. 7 illustrates CF VM 434 storing the state information and partial CDR in data segment 424 in an exemplary embodiment. CF VM 434 may also transmit an instruction to data storage system 422 to delete the ACR(Start) and ACR(Interim) from data segment 424 for the accounting session.

CF VM 434 may store or update state information in data segment 424 even when a partial CDR is not generated. For instance, when CF VM 434 retrieves an ACR(Interim) from data segment 434 that does not trigger generation of a partial CDR, it may update the state information in data segment 424 with a time stamp of the ACR(Interim).

Figure 8:
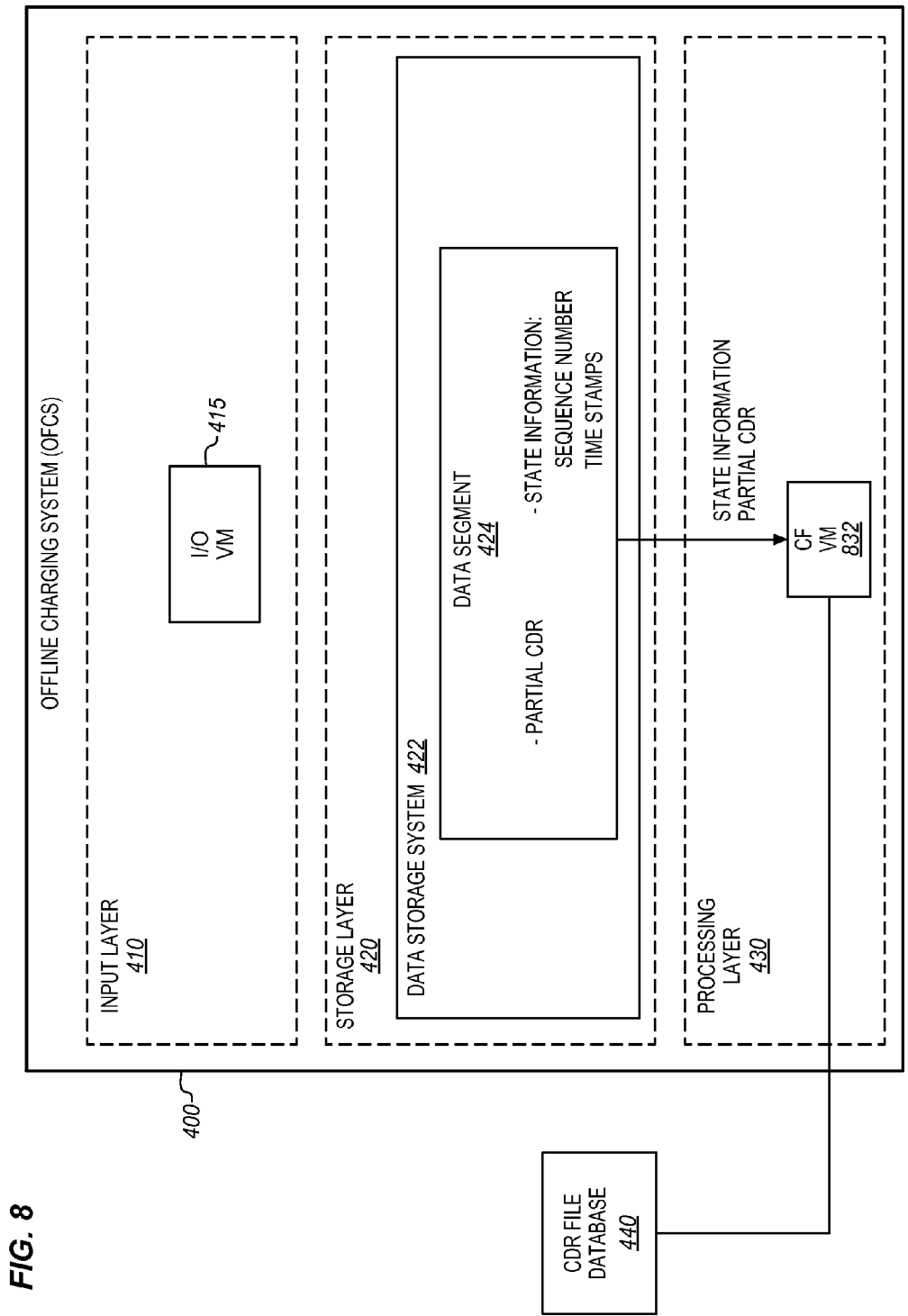
FIG. 8 illustrates a charging function VM retrieving data for an accounting session from a data segment in an exemplary embodiment.

If CF VM 434 happens to fail, another CF VM may be assigned to data segment 424 to handle the accounting session. For example, an orchestration layer may spin up a new CF VM to replace the CF VM 434 that failed. The new CF VM may retrieve a copy of the data stored in data segment 424 for the accounting session. FIG. 8 illustrates a CF VM retrieving data for the accounting session from data segment 424 in an exemplary embodiment. The new CF VM 832 retrieves a copy of the ACRs, the partial CDR, and/or the state information from data segment 424, and processes this data to provide the accounting functions for the accounting session going forward.

Figure 9:
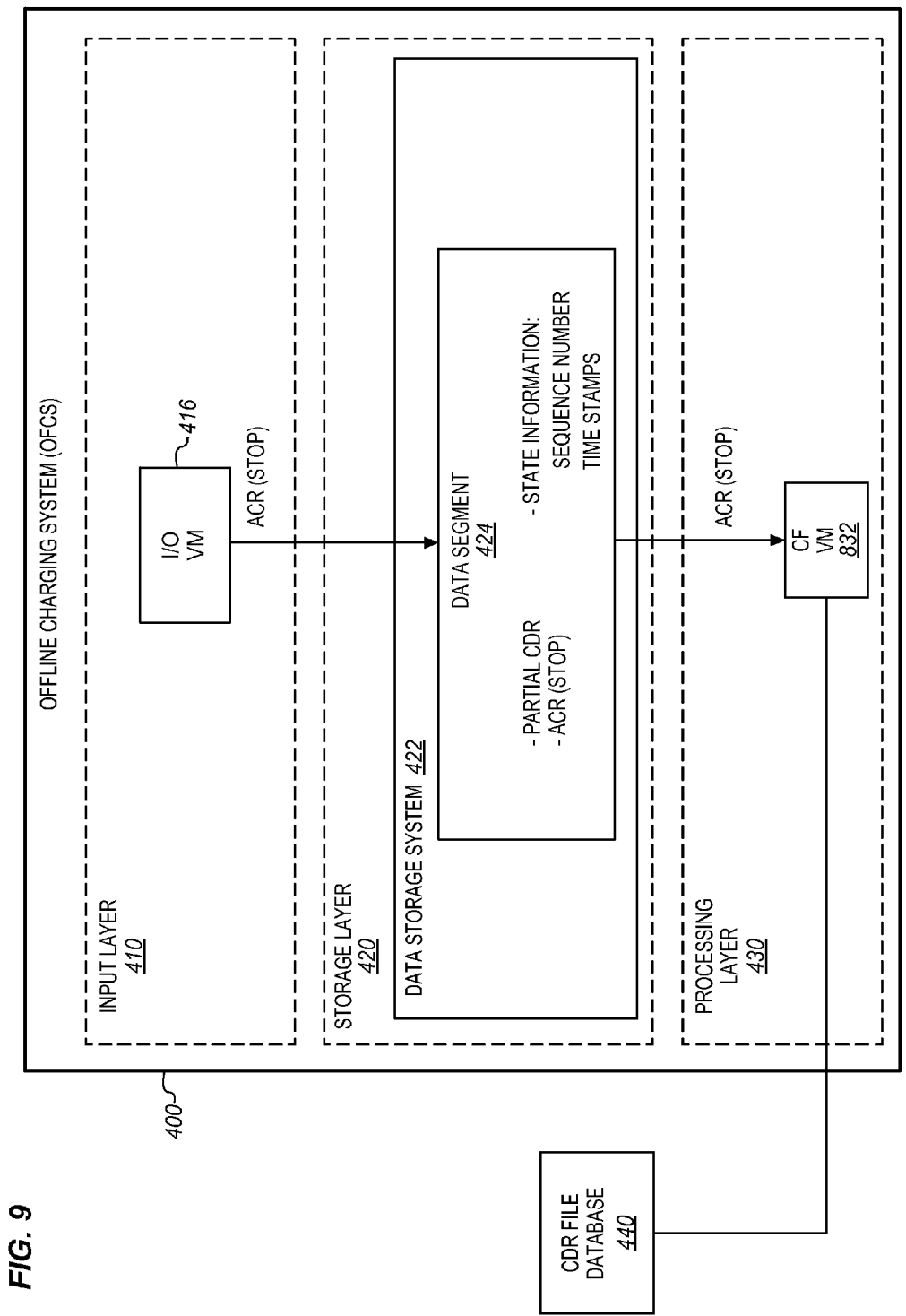
FIG. 9 illustrates an I/O VM storing an ACR(Interim) in a data segment in an exemplary embodiment.

Assume next that controller VM 412 receives a Diameter ACR(Stop) for the accounting session (see FIG. 4). Controller VM 412 selects an I/O VM 414-417 to handle the ACR(Stop) from the pool of available I/O VMs. Assume for this example that I/O VM 416 is selected for the ACR(Stop). When I/O VM 416 receives the ACR(Stop), it selects the same data segment 424 of data storage system 422 for the accounting session (e.g., by hashing the ICID or session ID associated with the accounting session). I/O VM 416 then stores the ACR(Stop) for the accounting session in the data segment 424. FIG. 9 illustrates I/O VM 416 storing the ACR(Stop) in data segment 424 in an exemplary embodiment.

Figure 10:
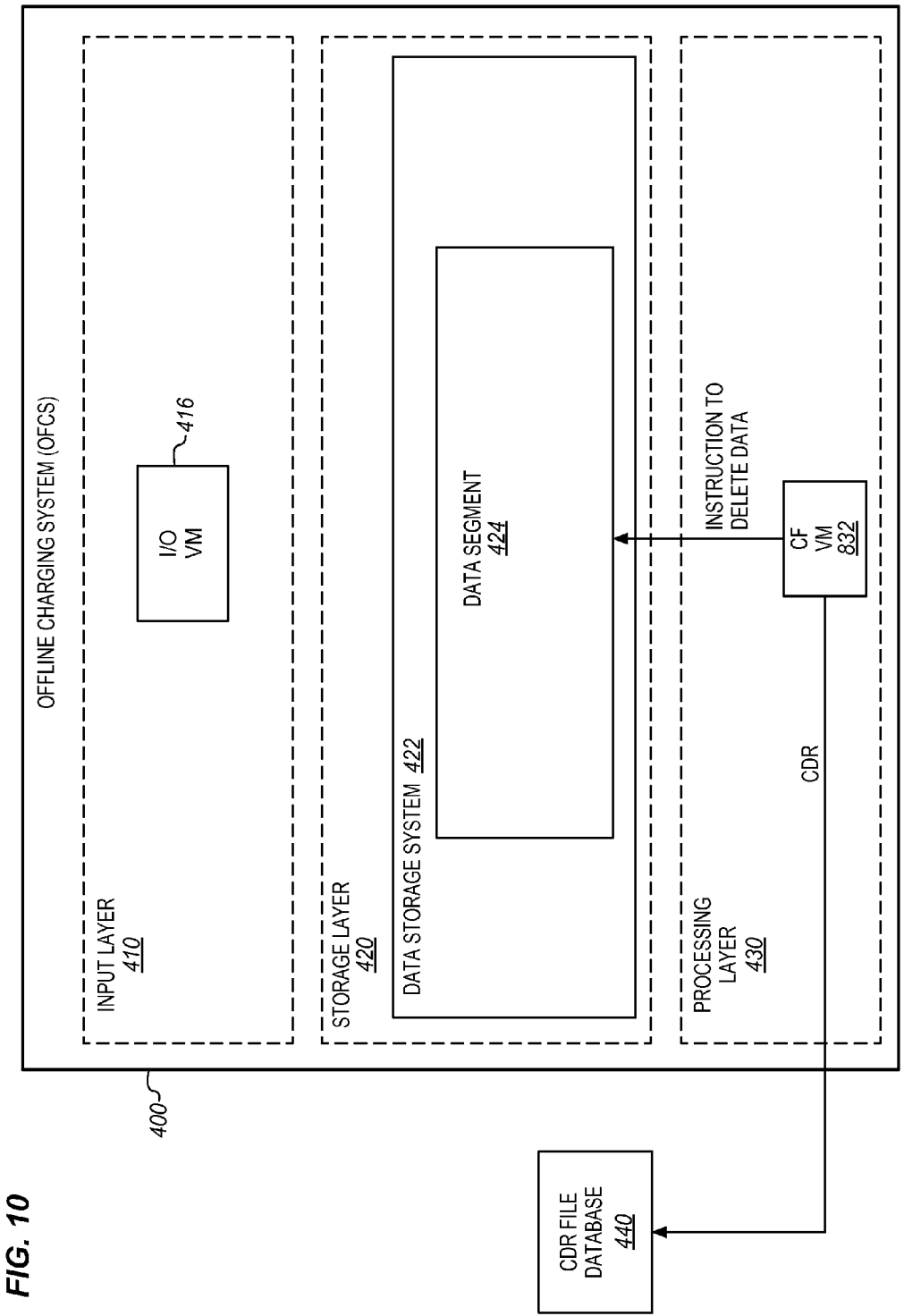
FIG. 10 illustrates charging function VM sending a CDR to a CDR file system in an exemplary embodiment.

When the ACR(Stop) is stored in data segment 424, CF VM 832 retrieves a copy of the ACR(Stop) from the data segment 424. Responsive to the ACR(Stop), CF VM 832 closes the present CDR for the accounting session, which is a complete CDR. CF VM 832 also aggregates the partial CDR with the complete CDR to generate an aggregated CDR for the accounting session, and forwards the aggregated CDR to CDR file system 440. FIG. 10 illustrates CF VM 832 sending a CDR to CDR file database 440 in an exemplary embodiment. CF VM 832 may also transmit an instruction to data storage system 422 to delete the data for the accounting session from data segment 424

Because data for the accounting session is stored in data storage system 422, any CF VM can access the data and handle accounting duties for the accounting session. A network operator is less likely to lose revenue due to a failure of a CF VM with this OFCS architecture.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the disclosure is not limited to those specific embodiments. The scope of the disclosure is defined by the following claims and any equivalents thereof.

I claim:

1. An apparatus comprising:
   an Offline Charging System (OFCS) comprising:
   a data storage system partitioned into a plurality of data segments;
   a plurality of Input/Output (I/O) devices configured to communicate with the data storage system; and
   a plurality of charging function devices configured to communicate with the data storage system;
   an I/O device is configured to receive an accounting record for an accounting session, to select a data segment of the data storage system for the accounting session, and to store the accounting record for the accounting session in the data segment;
   a charging function device is configured to retrieve a copy of the accounting record for the accounting session from the data segment, and to process the copy of the accounting record to generate a Charging Data Record (CDR) for the accounting session.

2. The apparatus of claim 1 wherein:
   the charging function device is configured to store state information for the accounting session in the data segment.

3. The apparatus of claim 2 wherein:
   the CDR comprises a partial CDR; and
   the state information includes:
   a sequence number for the partial CDR; and
   time stamps indicating a start time of the accounting session, and indicating a receipt time of the latest accounting record.

4. The apparatus of claim 2 wherein:
   the CDR comprises a partial CDR; and
   the charging function device is configured to store a copy of the partial CDR in the data segment.

5. The apparatus of claim 1 wherein:
   the charging function device is configured to forward the CDR to a CDR file system when the CDR comprises a complete CDR.

6. The apparatus of claim 5 wherein:
   the charging function device is configured to transmit an instruction to the data storage system to delete data for the accounting session from the data segment.

7. The apparatus of claim 1 wherein:
   the charging function devices each implement a Charging Data Function (CDF) and a Charging Gateway Function (CGF).

8. The apparatus of claim 1 wherein:
   the data storage system comprises cloud storage.

9. The apparatus of claim 1 wherein:
   the I/O device is configured to select the data segment based on an IMS Charging Identifier (ICID) assigned to the accounting session.

10. The apparatus of claim 1 wherein:
    the I/O device is configured to select the data segment based on a session identifier assigned to the accounting session.

11. A method for implementing an Offline Charging System (OFCS), wherein the OFCS includes a data storage system partitioned into a plurality of data segments, a plurality of Input/Output (I/O) devices configured to communicate with the data storage system, and a plurality of charging function devices configured to communicate with the data storage system, the method comprising:
    receiving, by an I/O device, an accounting record for an accounting session;
    selecting, by the I/O device, a data segment of the data storage system for the accounting session;
    storing, by the I/O device, the accounting record for the accounting session in the data segment;
    retrieving, by a charging function device, a copy of the accounting record for the accounting session from the data segment; and
    processing the copy of the accounting record at the charging function device to generate a Charging Data Record (CDR) for the accounting session.

12. The method of claim 11 further comprising:
    storing, by the charging function device, state information for the accounting session in the data segment.

13. The method of claim 12 wherein:
    the CDR comprises a partial CDR; and
    the state information includes:
    a sequence number for the partial CDR; and
    time stamps indicating a start time of the accounting session, and indicating a receipt time of the latest accounting record.

14. The method of claim 12 wherein the CDR comprises a partial CDR, the method further comprising:
    storing, by the charging function device, a copy of the partial CDR in the data segment.

15. The method of claim 11 further comprising:
    forwarding, by the charging function device, the CDR to a CDR file system when the CDR comprises a complete CDR.

16. The method of claim 15 further comprising:
transmitting an instruction from the charging function device to the data storage system to delete data for the accounting session from the data segment.

17. The method of claim 11 wherein:
the charging function devices each implement a Charging Data Function (CDF) and a Charging Gateway Function (CGF).

18. The method of claim 11 wherein:
the data storage system comprises cloud storage.

19. The method of claim 11 wherein selecting the data segment of the data storage system for the accounting session comprises:
selecting the data segment based on an IMS Charging Identifier (ICID) assigned to the accounting session.

20. The method of claim 11 wherein selecting the data segment of the data storage system for the accounting session comprises:
selecting the data segment based on a session identifier assigned to the accounting session.

* * * * *